(12) United States Patent

Lu et al.

(10) Patent No.: US 12,566,293 B2

(45) Date of Patent: Mar. 3, 2026

(54) HIGH ALIGNMENT TOLERANCE EDGE COUPLER

(71) Applicant: Taiwan Semiconductor Manufacturing Company, Ltd., Hsinchu (TW)

(72) Inventors: Hau-Yan Lu, Hsinchu City (TW); Wei-Kang Liu, Taichung City (TW); Yingkit Felix Tsui, Cupertino, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 198 days.

(21) Appl. No.: 18/320,535

(22) Filed: May 19, 2023

(65) Prior Publication Data

US 2024/0385372 A1 Nov. 21, 2024

(51) Int. Cl.
  *G02B 6/122* (2006.01)
  *G02B 6/136* (2006.01)
(52) U.S. Cl.
  CPC ........... *G02B 6/1228* (2013.01); *G02B 6/136* (2013.01)
(58) Field of Classification Search
  CPC ............................... G02B 6/1228; G02B 6/136
  See application file for complete search history.

(56) References Cited

U.S. PATENT DOCUMENTS

| | | | |
|---|---|---|---|
| 10,746,923 B2 | 8/2020 | Yu et al. | |
| 2018/0172909 A1* | 6/2018 | Asghari | G02B 6/305 |
| 2019/0339466 A1 | 11/2019 | Heck et al. | |
| 2022/0283387 A1 | 9/2022 | Rusu et al. | |
| 2023/0003926 A1 | 1/2023 | Bauters et al. | |

* cited by examiner

*Primary Examiner* — Chad H Smith

(74) *Attorney, Agent, or Firm* — Eschweiler & Potashnik, LLC

(57) ABSTRACT

An edge coupler has a wide end, a narrow end, and a tapering thickness. The narrow end is coupled to a waveguide in a photonic integrated circuit (PIC). The wide end is coupled to an optical transmitter or receiver. The edge coupler thickens by tapering downward into the buried oxide layer of a BOX substrate. An upper surface of the edge coupler may be planar. A pedestal may be formed in the oxide layer so that a laser diode mounted on the pedestal will be vertically aligned to the edge coupler. Alternatively, the pedestal may be formed in a substrate under the oxide layer so that the core of an optical fiber mounted on the pedestal will be vertically aligned to the edge coupler. The pedestal may be in a cavity that facilitates horizontal alignment between the laser diode, optical fiber, or other such device and the edge coupler.

20 Claims, 12 Drawing Sheets

1600

1601
Provide BOX Substrate

1603
Etch An Edge Coupler Shaped Trench

1605
Etch To Deepen The Trench And Provide A Tapering Depth

1607
Fill Trench With Optical Material To Form Edge Coupler

1609
Form Photonic Circuit Using Top Layer

1611
Form Metal Interconnect

1613
Etch To Form Pedestal

1615
Mount Optical Transmitter Or Reciever On Pedestal

HIGH ALIGNMENT TOLERANCE EDGE COUPLER

BACKGROUND

Photonic integrated circuits (PICs) are widely used in communications and are increasingly being used for sensing and computing. PICs may operate at higher speeds than electrical integrated circuits (ICs) and may be combined with ICs to enhance functionality. A PIC includes two or more photonic devices coupled to form a circuit. Examples of photonic devices include waveguides, splitters, multiplexers, filters, modulators, sensors, and switches. A PIC may interface with an optical transmitter or receiver such as a laser or an optical fiber through a grating coupler, an edge coupler, or the like.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3-14B illustrate cross-sectional and plan views of a photonic device being manufactured in accordance with some embodiments.

DETAILED DESCRIPTION

Figures 1A, 1B:
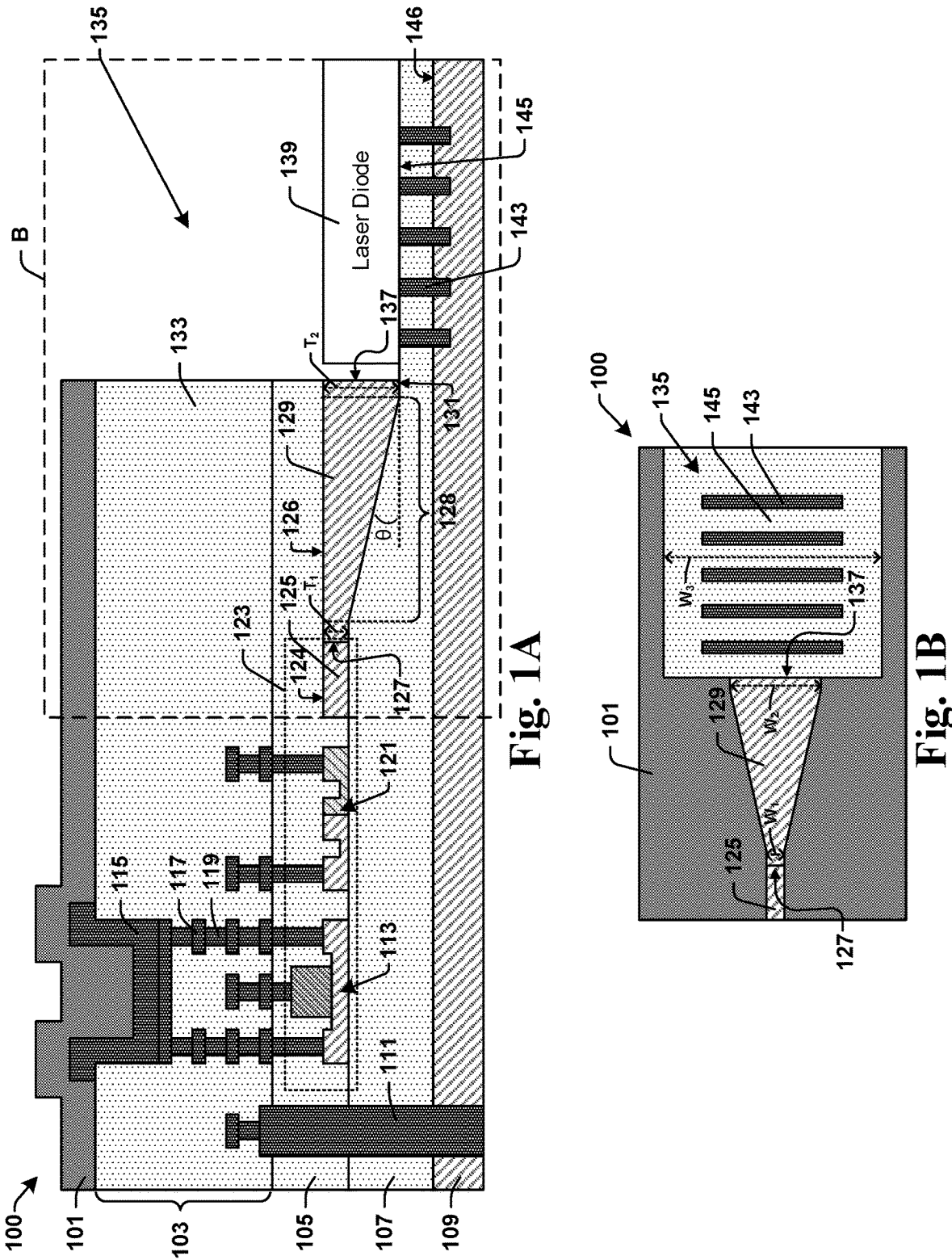
FIG. 1A illustrates a cross-sectional view of a photonic device according to some embodiments.
FIG. 1B illustrates a plan view of the photonic device in the area B of FIG. 1A.

The present disclosure provides many different embodiments, or examples, for implementing different features of this disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for case of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

An edge coupler may be used to couple a waveguide of a PIC to an optical transmitter or receiver such as an optical fiber or laser that has a larger mode size than the waveguide. To reduce coupling losses, the edge coupler may have a width that narrows from a mode size of the optical transmitter or receiver to a mode size of the waveguide. However, coupling losses may remain large due to differences in thickness between the waveguide and the optical transmitter or receiver and due to misalignment between the edge coupler and the optical transmitter or receiver.

Some aspects of the present disclosure relate to an edge coupler that has a thickness that tapers from a narrow end to a wide end. The narrow end is coupled to a waveguide in a PIC. The wide end is coupled to an optical transmitter or receiver. An upper surface of the edge coupler may be planar. In some embodiments, a top of the edge coupler is coplanar with a top of the waveguide. In some embodiments, the waveguide is disposed on an oxide layer and the edge coupler thickens by tapering downward into the oxide layer. In some embodiments, the oxide layer is the buried oxide layer of a BOX substrate in which the PIC is formed.

In some embodiments, a pedestal is provided that solves the problem of aligning an optical transmitter or receiver to the edge coupler. In some embodiments, the pedestal is formed in the oxide layer and the pedestal is at approximately the same height as the bottom of the edge coupler so that an optical transmitter or receiver such as a laser diode mounted on the pedestal will be vertically aligned to the edge coupler. In some embodiments, the pedestal is formed in a substrate under the oxide layer so that the core of an optical fiber mounted on the pedestal will be vertically aligned to the edge coupler. In some embodiments, the pedestal is in a cavity that facilitate horizontal alignment between the optical transmitter or receiver and the edge coupler.

Some aspects of the present disclosure relate to a process of forming an edge coupler that has a thickness that tapers from a narrow end to a wide end. The process may be applied to a BOX substrate. The BOX substrate includes an oxide layer between a carrier substrate and a top layer of optical material. The process includes etching a trench in the top layer and the oxide layer. The trench has a narrow end and a wide end. At the narrow end the trench is shallow having a depth approximately equal to a thickness of the top layer. At the wide end the trench is deeper. In a first region, which is between the narrow end and the wide end, the trench's depth tappers from the narrow end's depth to the wide end's depth. Backfilling the trench with an optical material forms the edge coupler. In some embodiments, the trench is filled with the same material as the top layer. A photonic circuit may be formed in the top layer including a waveguide coupled to the narrow end of the edge coupler.

In some embodiments, the trench that is filled to form the edge coupler extends into a second region in which the pedestal is later formed. The trench may have a constant depth in the second region. The optical material that fills the trench extends into the second region. Etching that forms the top of the pedestal etches through the optical material in the second region. The transition from the optical material to the oxide layer beneath the optical material may be used to determine an endpoint for the etching process. If the etch stops at the point of transition, the top of the pedestal will be aligned to the bottom of the edge coupler. In some embodiments, further etching takes place to lower the pedestal to the correct height. When an optical transmitting or receiving device is subsequently mounted on the pedestal, it is automatically aligned vertically to the edge coupler.

FIG. 1A illustrates a cross-sectional view of a photonic device 100 according to some embodiments. FIG. 1B illustrates a plan view of the photonic device 100 in the area B of FIG. 1A. The photonic device 100 includes an edge coupler 129 having a narrow end 127 and a wide end 137. The narrow end 127 is coupled to a waveguide 125 in a photonic integrated circuit (PIC) 123. The wide end 137 is aligned to a laser diode 139 mounted on a pedestal 145.

In addition to the waveguide 125, the PIC 123 may include other photonic circuit components such as a photodetector 113, a modulator 121, and the like, all of which are disposed over an oxide layer 107. The edge coupler 129 is in and on the oxide layer 107 and a portion of the oxide layer 107 provides the pedestal 145. Metal plugs 143 may bind the laser diode to the pedestal 145. In some embodiments, the metal plugs 143 extend into the handle substrate 109 and provide an electrical terminal for the laser diode 139. A second electrical terminal (not shown) may be attached to the top of the laser diode 139.

In a zone 128 between the narrow end 127 and the wide end 137, a width of the edge coupler 129 tapper from a first width $W_1$ at to a second width $W_2$. In some embodiments, the first width $W_1$ is in the range from about to about 100 nm to about 2000 nm. In some embodiments, the first width $W_1$ is in the range from about to about 250 nm to about 1000 nm. In some embodiments, the second width $W_2$ is in the range from about 1 μm to about 20 μm. In some embodiments, the second width $W_2$ is in the range from about 2 μm to about 10 μm. In some embodiments, the second width $W_2$ is from about 3 to about 30 times greater than the first width $W_1$. In some embodiments, the second width $W_2$ is from about 5 to about 10 times greater than the first width $W_1$.

A thickness of the edge coupler 129 tappers in conjunction with the width. The thickness tappers from a first thickness $T_1$ at to a second thickness $T_2$. In some embodiments, the first thickness $T_1$ is in the range from about to about 50 nm to about 1000 nm. In some embodiments, the first thickness $T_1$ is in the range from about to about 100 nm to about 600 nm. In some embodiments, the second thickness $T_2$ is in the range from about 500 nm to about 10 μm. In some embodiments, the second thickness $T_2$ is in the range from about 1 μm to about 5 μm. In some embodiments, the second thickness $T_2$ is from about 3 to about 30 times greater than the first thickness $T_1$. In some embodiments, the second thickness $T_2$ is from about 5 to about 10 times greater than the first thickness $T_1$.

In some embodiments, a top 126 of the edge coupler 129 is planar. The top 126 is vertically aligned with a top 124 of the waveguide 125. The thickness of the edge coupler 129 tappers by descending into the oxide layer 107. In some embodiments, the angle of decent θ is in the range from about 5 to about 30 degrees. In some embodiments, the angle of decent θ is in the range from about 2 to about 15 degrees.

A metal interconnect 103 including wires 117 and vias 119 surrounded by interlevel dielectric 133 may be disposed over and coupled to the PIC 123. The metal interconnect 103 may couple the PIC 123 to an electronic integrated circuit (not shown) or to an external device. The electronic integrated circuit may be located elsewhere on the handle substrate 109 or on a distinct substrate that is also part of the photonic device 100. One or more distinct substrates or other devices may be attached either under or over the handle substrate 109. Substrates and devices under the handle substrate 109 may be coupled to the metal interconnect 103 by through substrate via 111 or the like. Substrates and devices over the handle substrate 109 may be coupled to the metal interconnect 103 through a contact pad 115 or the like.

The pedestal 145 is at a height such that the laser diode 139 is vertically aligned to the wide end 137 of the edge coupler 129 by mounting the laser diode 139 on the pedestal 145. In some embodiments, the pedestal 145 is closer in height to the bottom 131 of the edge coupler 129 than it is to the top 146 of the handle substrate 109. In some embodiments, a difference in height between the pedestal 145 and the bottom 131 of the edge coupler 129 is no more than about a thickness of the waveguide 125. In some embodiments, the difference in height is no more than about 100 nm. In some embodiments, the pedestal 145 is at about the same height as the bottom 131 of the edge coupler 129.

The pedestal 145 is at the bottom of a pedestal cavity 135. The pedestal cavity 135 may have a width $W_3$ that is limited to assist in obtaining horizontal alignment between the laser diode 139 or other such device and the edge coupler 129. In some embodiments, the width $W_3$ is from about 1 to about 10 times the width $W_2$ of the wide end 137. In some embodiments, the width $W_3$ is from about 2 to about 5 times the width $W_2$.

Figures 2A, 2B:
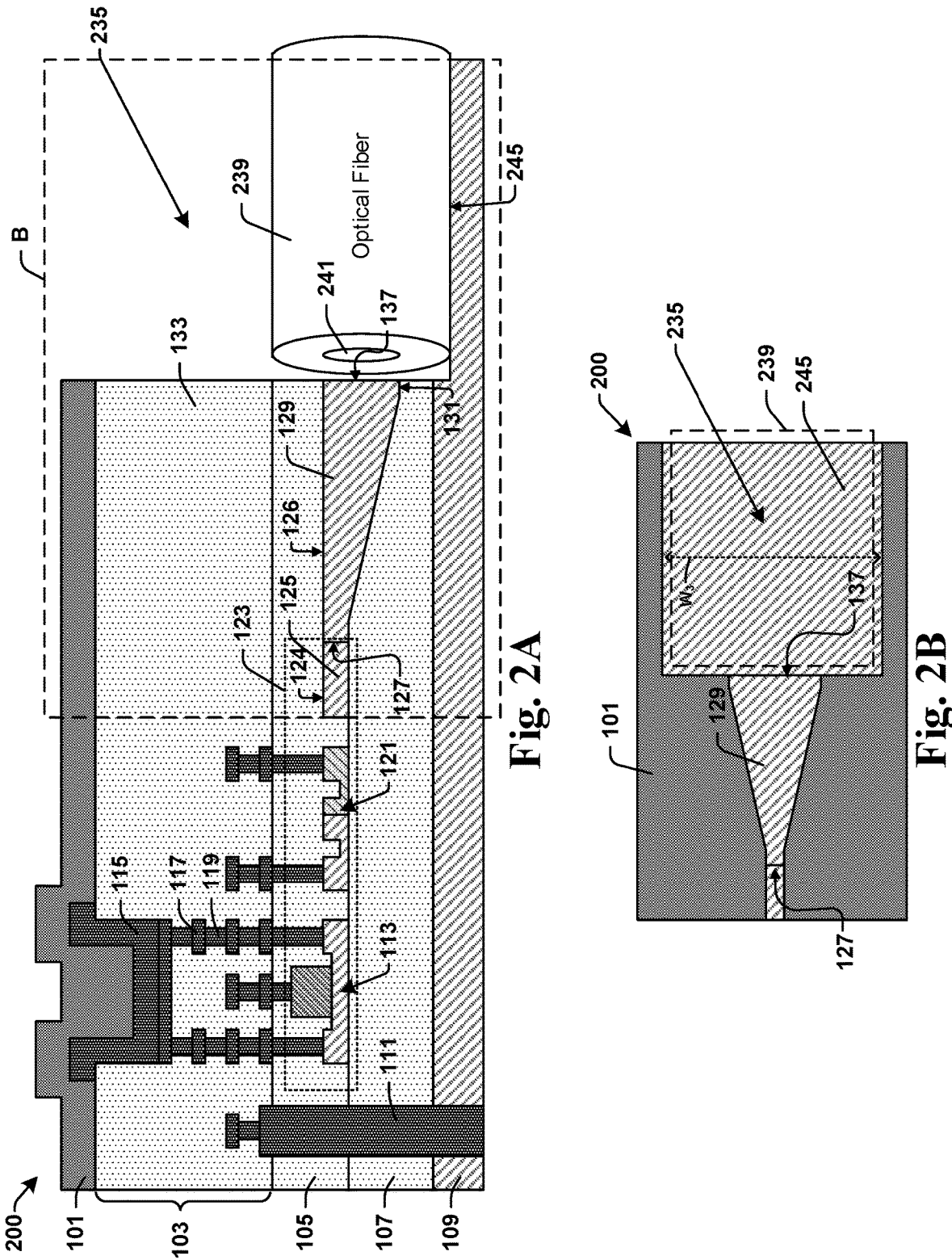
FIG. 2A illustrates a cross-sectional view of a photonic device according to some embodiments.
FIG. 2B illustrates a plan view of the photonic device in the area B of FIG. 2A.

FIG. 2A illustrates a cross-sectional view of a photonic device 200 according to some other embodiments. FIG. 2B illustrates a plan view of the photonic device 200 in the area B of FIG. 2A. The photonic device 200 has many of the same components as the photonic device 100 of FIGS. 1A-1B, but instead of the pedestal 145 formed in the oxide layer 107 (see FIG. 1A), the photonic device has a pedestal 245 that is lower and formed in the handle substrate 109. The pedestal 245 is in a pedestal cavity 235 having a width $W_3$ that may be only slightly larger than a diameter of the optical fiber 239 so that the pedestal cavity 235 facilitates horizontal alignment between the optical fiber 239 and the edge coupler 129. The height of the pedestal 245 may be such that when the optical fiber 239 is placed on the pedestal 245, a core 241 of the optical fiber 239 is at the same height as the edge coupler 129.

FIGS. 3-14B are cross-sectional and plan view illustrations exemplifying a method according to the present disclosure of forming a photonic device according to the present disclosure. While FIGS. 3-14B are described with reference to various embodiments of a method, it will be appreciated that the structures shown in FIGS. 3-14B are not limited to the method but rather may stand alone separate from the method. FIGS. 3-14B are described as a series of acts. The order of these acts may be altered in other embodiments. While FIGS. 3-14B illustrate and describe a specific set of acts, some may be omitted in other embodiments. Further, acts that are not illustrated and/or described may be included in other embodiments. While the method of FIGS. 3-14B illustrate the formation of the photonic device 100 of FIGS. 1A and 1B, the method may be used to form other photonic devices.

Figures 3, 4A, 4B:
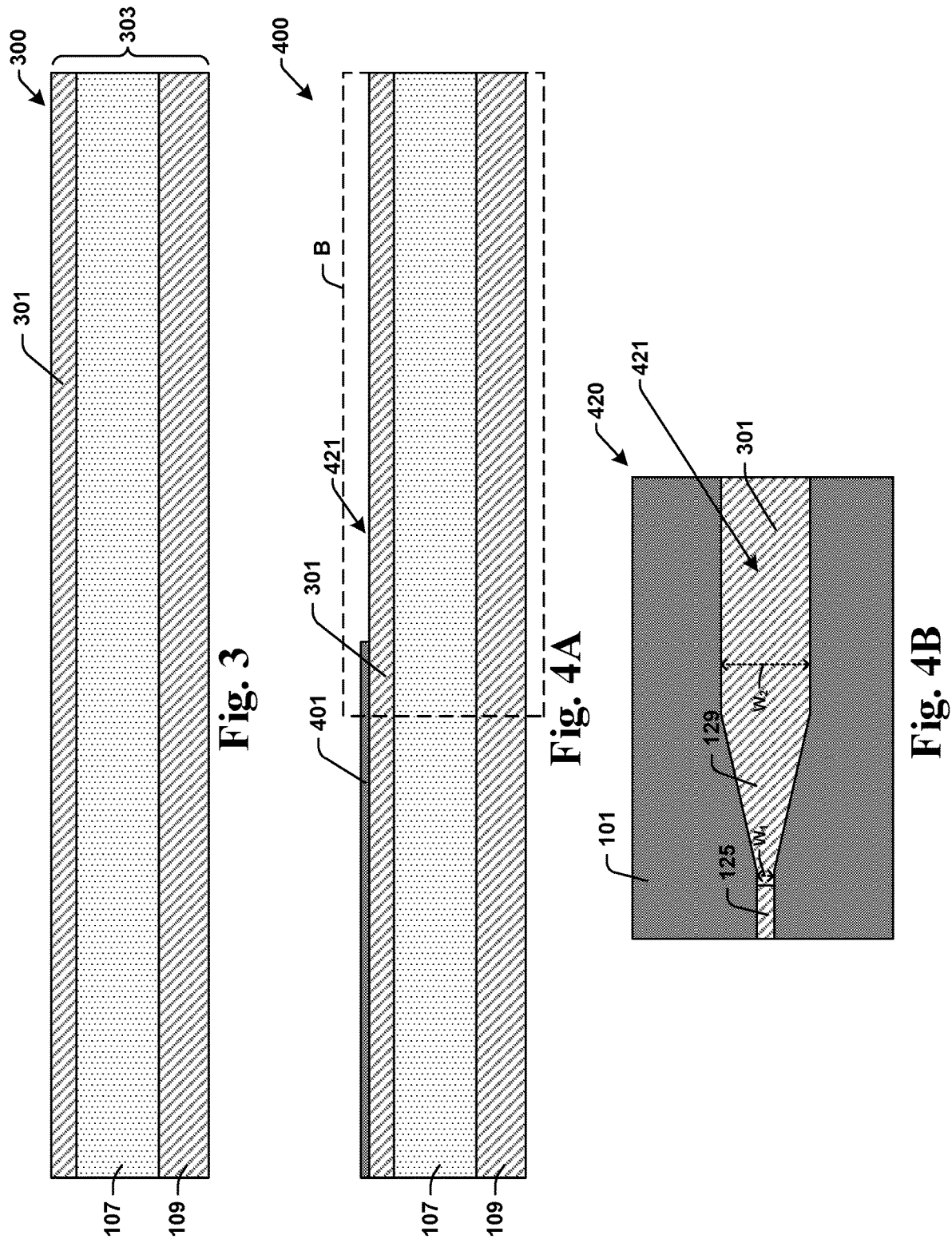

As shown by the cross-sectional view 300 of FIG. 3, the method may begin by providing a BOX substrate 303. The BOX substrate 303 comprises the handle substrate 109, the oxide layer 107, and the top layer 301. The handle substrate 109 may be a material such as a glass, ceramic, sapphire, or a semiconductor substrate. The semiconductor may be silicon (Si), a group III-V semiconductor or some other binary semiconductor (e.g., GaAs), a tertiary semiconductor (e.g., AlGaAs), a higher order semiconductor, or the like. The semiconductor may be doped or undoped. In some embodiments, the handle substrate 109 is conductive.

The oxide layer 107 may be, for example, silicon dioxide (SiO$_2$) or the like. The oxide layer 107 is operative as cladding for optical devices formed in the top layer 301. Accordingly, the oxide layer 107 may be referred to as a cladding layer. In some embodiments, the oxide layer 107 has a thickness in the range from about 0.5 μm to about 4 μm.

The top layer 301 comprises an optical material such as silicon (Si) or silicon nitride (Si$_3$N$_4$). The top layer 301 has a higher refractive index than the oxide layer 107. In some embodiments, the top layer 301 is silicon. The silicon may be doped or undoped. In some embodiments, the top layer 301 has a thickness in the range from about 100 nm to about 1.5 μm.

As shown by the cross-sectional view 400 of FIG. 4A and the plan view 420 of FIG. 4B, the process may continue with forming a hard mask 401 over the top layer 301. The hard mask 401 is patterned with an opening 421. The opening 421 widens from the first width W$_1$ to the second width W$_2$ (compare FIG. 1B). The hard mask 401 comprise silicon nitride (Si$_3$N$_4$), silicon carbide (SiC), silicon oxynitride (SiON), aluminum nitride (AlN), the like, or any other suitable material. The hard mask 401 may be patterned by photolithography, electron beam lithography, the like, or any other suitable process.

Figure 5A:
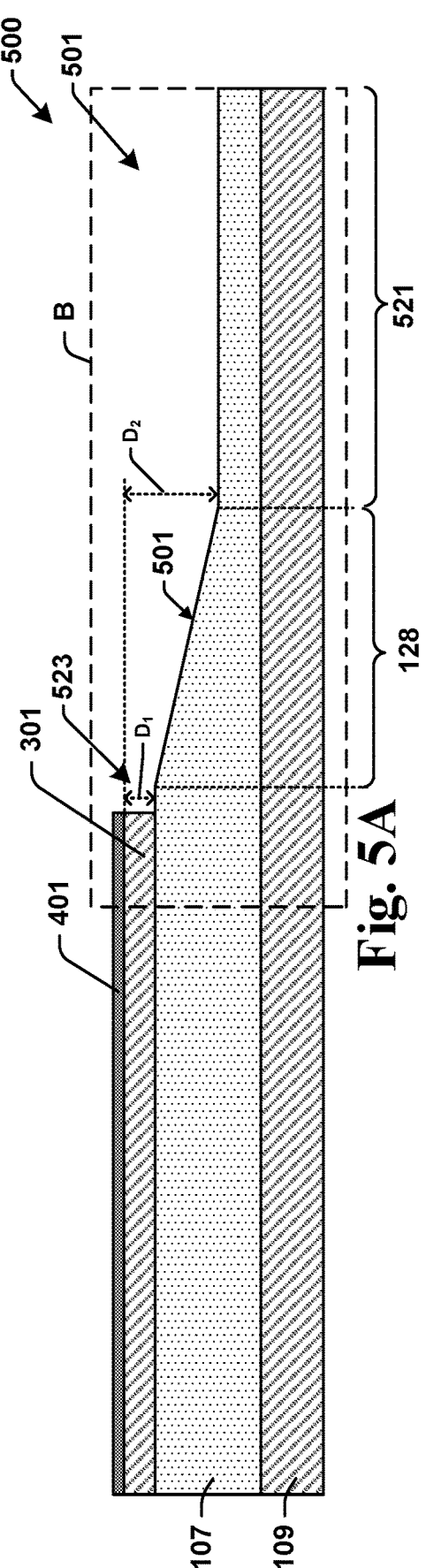
Figure 5B:
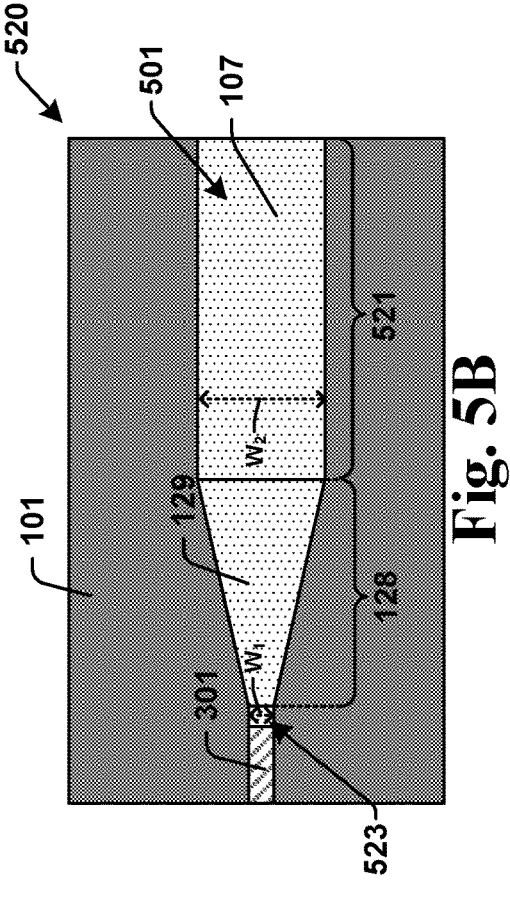

As shown by the cross-sectional view 500 of FIG. 5A and the plan view 520 of FIG. 5B, the process continues with etching to form the trench 501 in the top layer 301 and the oxide layer 107. In a first zone 523, the trench 501 has a depth D$_1$, which approximately equal to a thickness of the top layer 301. In a second zone 521, the trench 501 has a constant depth D$_2$ which is approximately equal to the thickness T$_2$ of the wide end 137 of the waveguide 125 (see FIG. 1A). In the zone 128 that is between the first zone 523 and the second zone 521, the depth of the trench 501 tapers from the depth D$_1$ to the depth D$_2$. In the zone 128 the width of the trench 501 is tapering from the width W$_1$ to the width W$_2$ in conjunction with the tapper in depth.

The trench 501 may be formed by one or more etch processes. The processes may include dry etching, wet etching, or a combination of both. In some embodiments, at least one of the processes is of a type that is mass-transport rate limited so that it provides an etch rate that varies in relation to the width of the trench 501. For example, the etch process may be a plasma etch with conditions selected to provide a high sensitivity of etch rate to trench width. In this way, the variation in depth of the trench 501 will naturally taper in conjunction with the tapering of the width of the trench 501. It should be appreciated that the width and depth of the trench 501 taper more gradually than is shown in the figures. Having the width and depth of the trench 501 taper gradually facilitates implementation of this type of process control.

Figures 6, 7, 8:
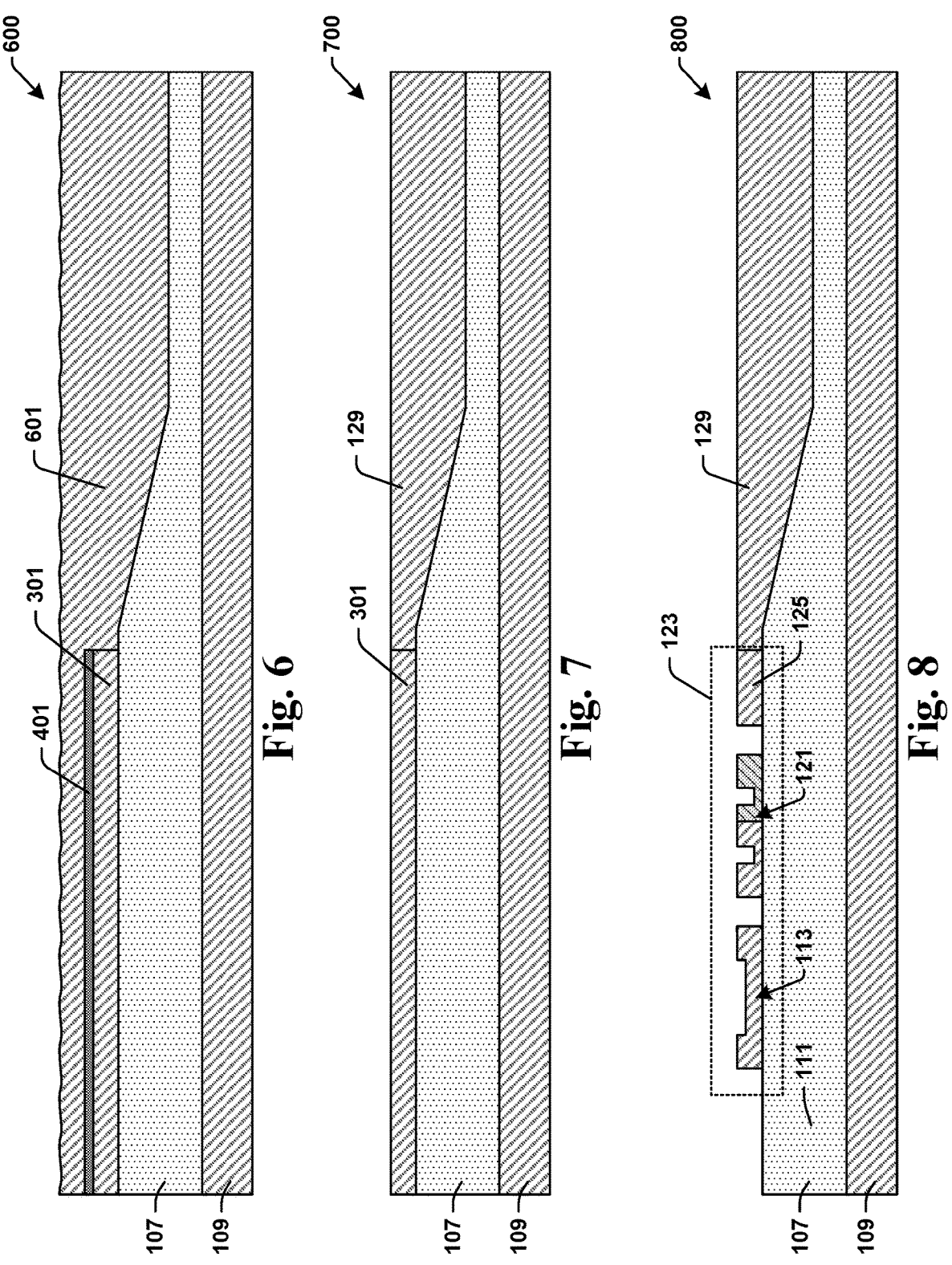

As shown by the cross-sectional view 600 of FIG. 6, an optical material 601 may be deposited so as to fill the trench 501. The optical material is one that is transparent and has a higher refractive index than the oxide layer 107. Example of optical materials that may be suitable include silicon nitride (Si$_3$N$_4$), silicon, and the like. In some embodiments, the optical material 601 is silicon. The silicon may be polysilicon or amorphous silicon. The silicon may be doped or undoped. In some embodiment, the optical material 601 has the same composition as the top layer 301. The optical material 601 may be deposited by any suitable process.

Examples of process that may be suitable include chemical vapor deposition (CVD), physical vapor deposition (PVD), and the like.

As shown by the cross-sectional view 700 of FIG. 7, a planarization process may be carried out on the structure shown by the cross-sectional view 600 of FIG. 6 to remove a portion of the optical material 601 that deposited outside the trench 501. The planarization process defines the edge coupler 129 from the optical material 601. In some embodiments, the planarization process removes the hard mask 401. The planarization process may also reduce a thickness of the top layer 301. The planarization process may be chemical mechanical polishing (CMP), the like, or any other suitable process.

As shown by the cross-sectional view 800 of FIG. 8, the top layer 301 may be doped and patterned to form components of the PIC 123. These components may include, for example, the waveguide 125, the modulator 121, and the photodetector 113. The patterning and doping process may include the formation of masks, dry etching, wet etching, ion implantation, the like, and other such processing steps. In some embodiments, the photonic circuit components are in a single layer over the oxide layer 107.

Figures 9, 10:
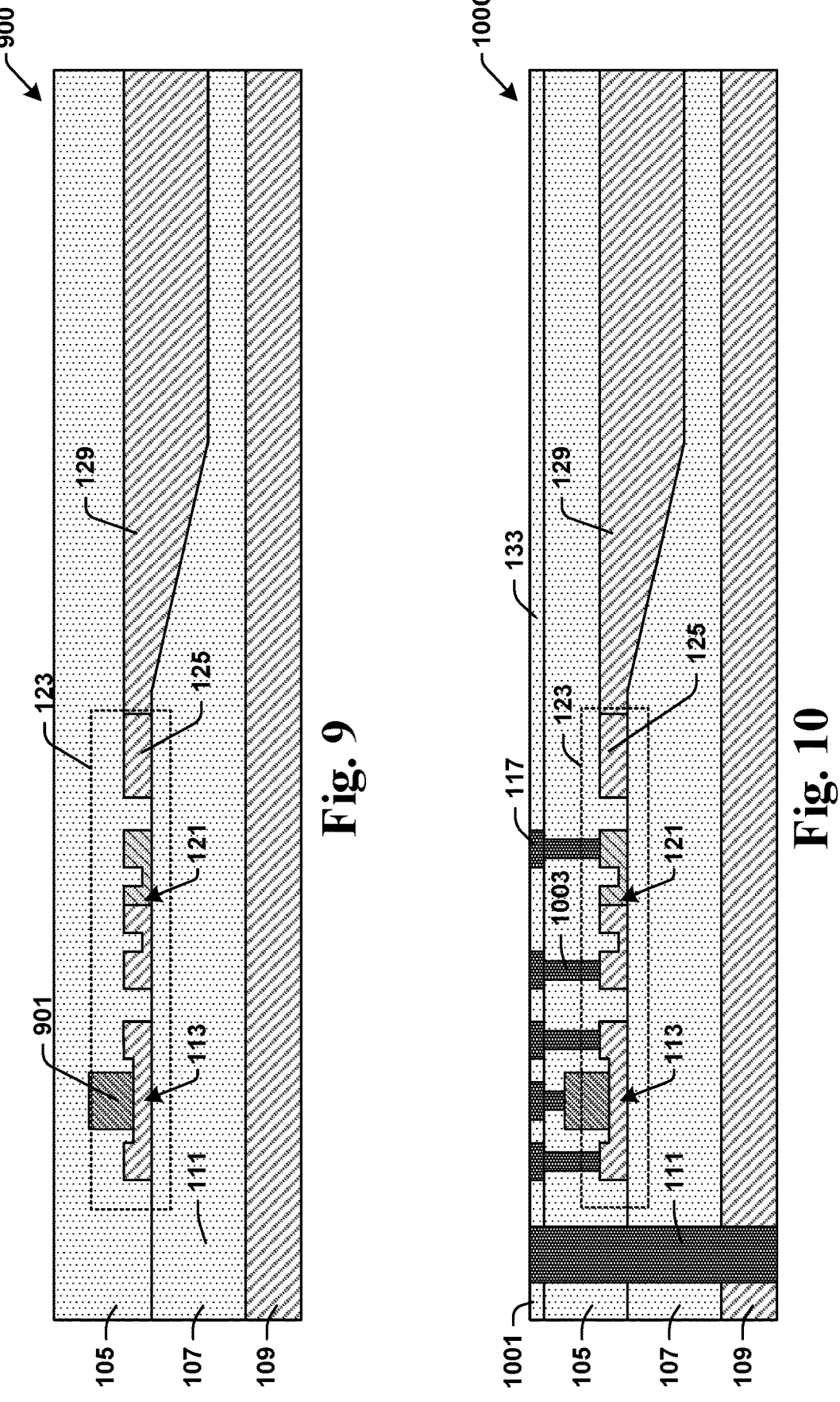

As shown by the cross-sectional view 900 of FIG. 9, additional processing may take place related to the formation of the PIC 123. That additional processing includes deposition of a cladding layer 105. The cladding layer 105 may be, for example, silicon dioxide (SiO$_2$) or the like. The cladding layer 105 may be deposited by CVD, PVD, the like, or any other suitable process. The additional processing may further include forming an opening in the cladding layer 105 and epitaxially growing within that opening a semiconductor material 901, which may be for example geranium (Ge) or the like. The semiconductor material 901 form part of the photodetector 113.

As shown by the cross-sectional view 1000 of FIG. 10, a first metallization layer 1001 may be formed over the cladding layer 105. The first metallization layer 1001 includes wires 117 within interlevel dielectric 133. The interlevel dielectric 133 may be silicon dioxide (SiO$_2$), a low k dielectric, the like, or any other suitable material. The interlevel dielectric 133 may be deposited by CVD, PVD, the like, or any other suitable process. Metal plugs 1003 may couple the wires 117 to electrical interface components of the PIC 123. The through substrate via 111 may also be formed at this stage of processing. The metal plugs 1003 and the wires 117 are formed of conductive materials such as metals. The metals may be copper (Cu), silver (Si), gold (Au), tungsten (W), cobalt (Co), aluminum (Al), the like, alloys thereof, or any other suitable metals. The conductive material may be deposited by CVD, PVD, electroplating, electroless plating, the like, or any other suitable process. The process may be a damascene process, a dual damascene, or the like. The through substrate via 111 is likewise formed by etching an opening (not shown) and filling the opening with a conductive material. The conductive material may be polysilicon, a metal, the like, or any other suitable material and may be deposited by CVD, PVD, electroplating, electroless plating, the like, or any other suitable process.

Figure 11:
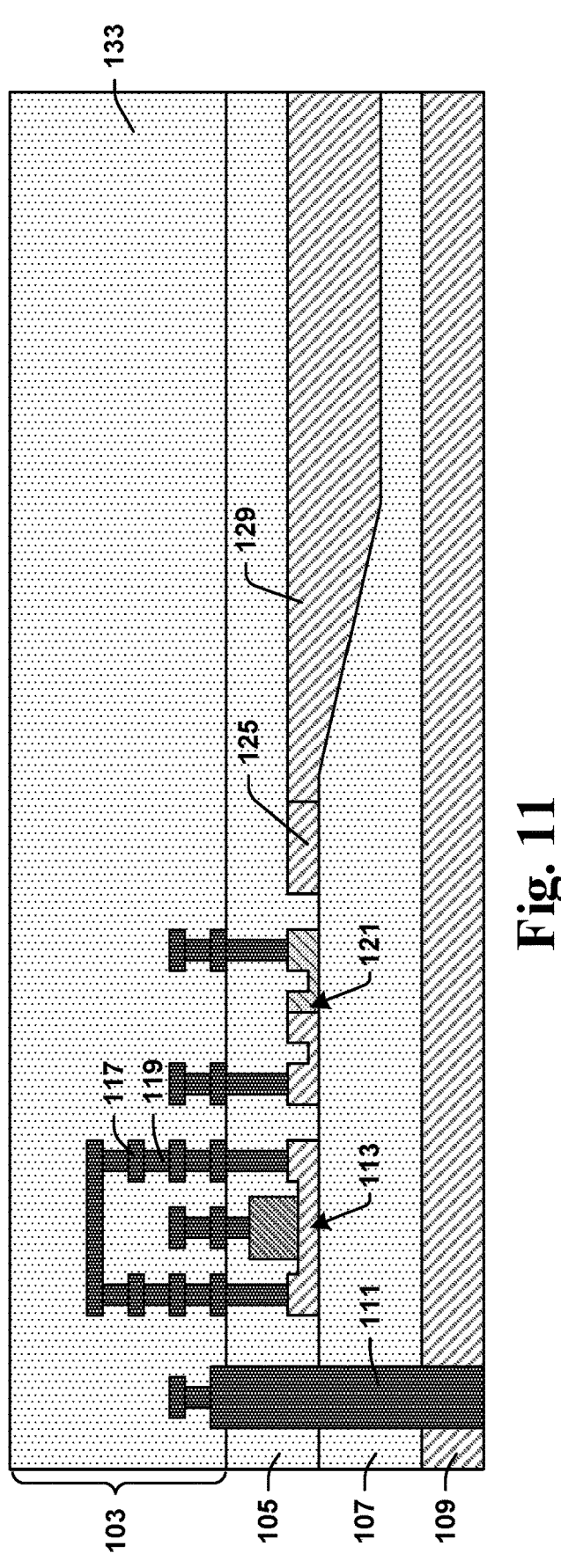

As shown by the cross-sectional view 1100 of FIG. 11, additional metallization layers and interlevel dielectric 133 may be deposited to complete the formation of the metal interconnect 103. The metal interconnect 103 may include a greater or lesser number of metallization layer than are illustrated.

Figure 12:
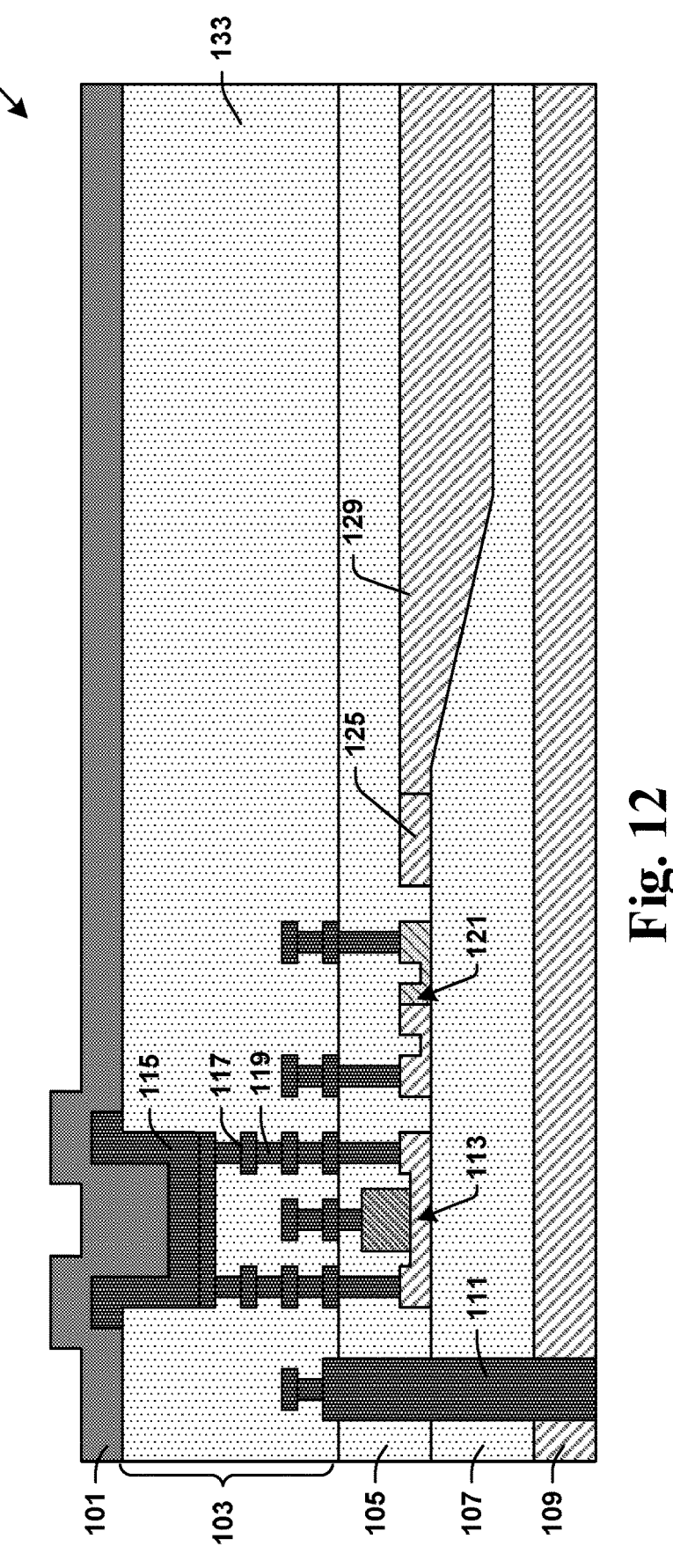

As shown by the cross-sectional view 1200 of FIG. 12, a contact pad 115 may be formed over the metal interconnect 103 followed by deposition of a passivation layer 101. The contact pad 115 may be used to couple other devices or chips to the handle substrate 109. Although a contact pad 115 is illustrated, other contact structures may be used such as bonding pads. These structures may be on the bottom of the handle substrate 109 and interface with the metal interconnect 103 via the through substrate via 111 or the like. The additional devices or chips may include, photonic circuits, electrical circuits, the like, or any other suitable devices. The passivation layer 101 may be silicon nitride ($Si_3N_4$), the like, or any other suitable material and may be deposited by CVD, PVD, the like, or any other suitable process. In some embodiments, the passivation layer 101 has a thickness in the range from about 1 μm to about 3 μm.

Figures 13A, 13B:
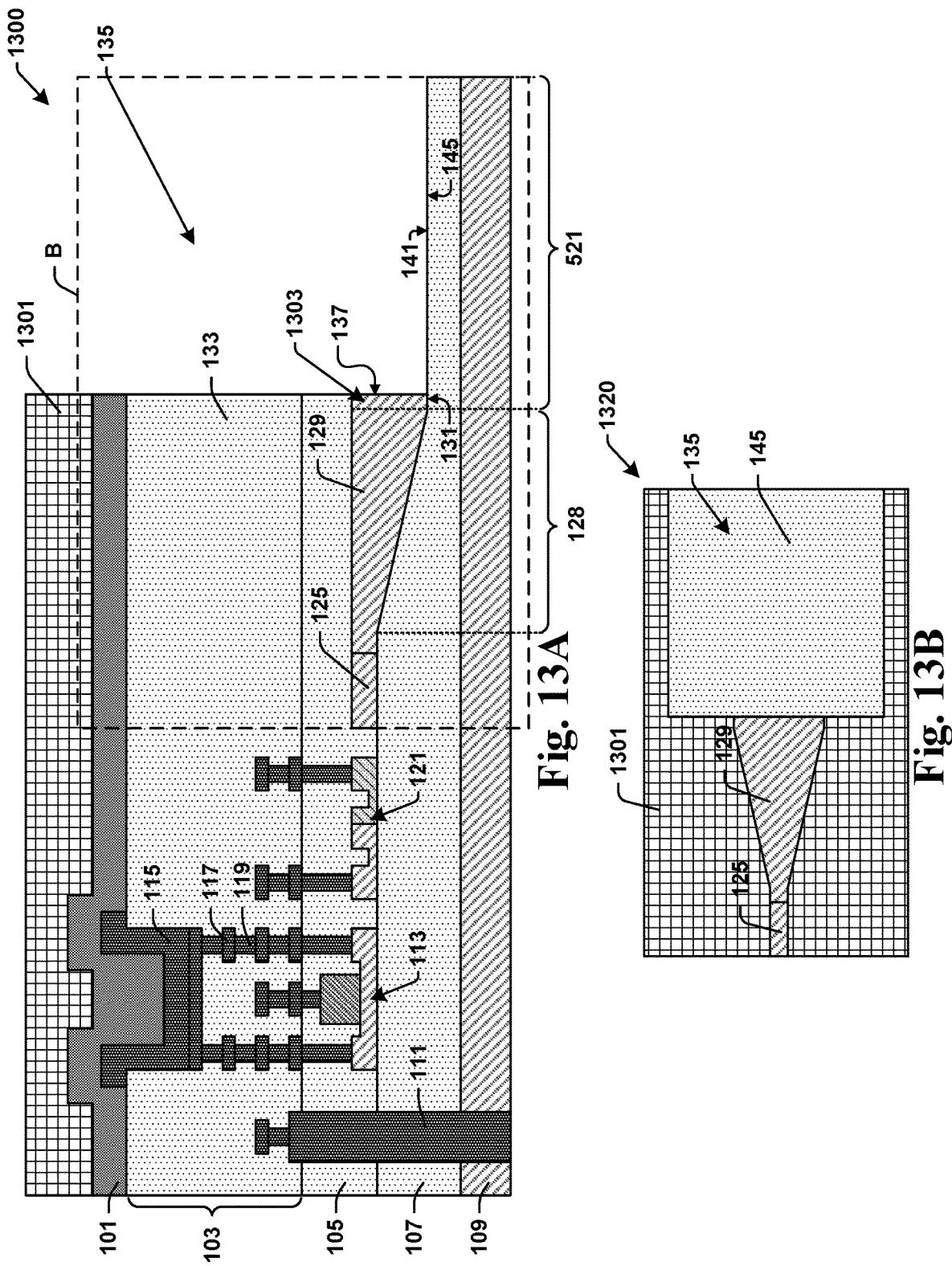

As shown by the cross-sectional view 1300 of FIG. 13A and the plan view 1320 of FIG. 13B, a mask 1301 may be formed and used to etch the pedestal cavity 135. Etching to form the pedestal cavity 135 includes etching through the passivation layer 101, the interlevel dielectric 133, the cladding layer 105, and an end portion of the edge coupler 129. The pedestal cavity 135 cuts through the edge coupler 129 in the second zone 521 where the edge coupler 129 has a constant thickness. A portion 1303 of the edge coupler 129 having constant thickness may remain. The portion 1303 is between the wide end 137 and the zone 128 where the thickness is tapering. The etch process may terminate after breaking through the edge coupler 129 so as to expose the oxide layer 107 that lies underneath. The exposed portion of the oxide layer 107 provides the pedestal 145.

The etch process may include wet etching, dry etching, or a combination thereof. In some embodiments, the composition of the edge coupler 129 is used to determine an endpoint of the etch process. For example, a byproduct of etching the optical material of which the edge coupler 129 is composed may be monitored during the etch process. A drop in the concentration of that byproduct may be used to mark the endpoint. In some embodiments, a last stage of the etch process includes an etch that selectively removes the optical material of the edge coupler 129 at a much higher rate than the material of the oxide layer 107. The trench 501 (see FIG. 5B) may be widened to the dimensions of the pedestal cavity 135 in order to facilitate this processing. After etching, the mask 1301 may be stripped.

Figures 14A, 14B:
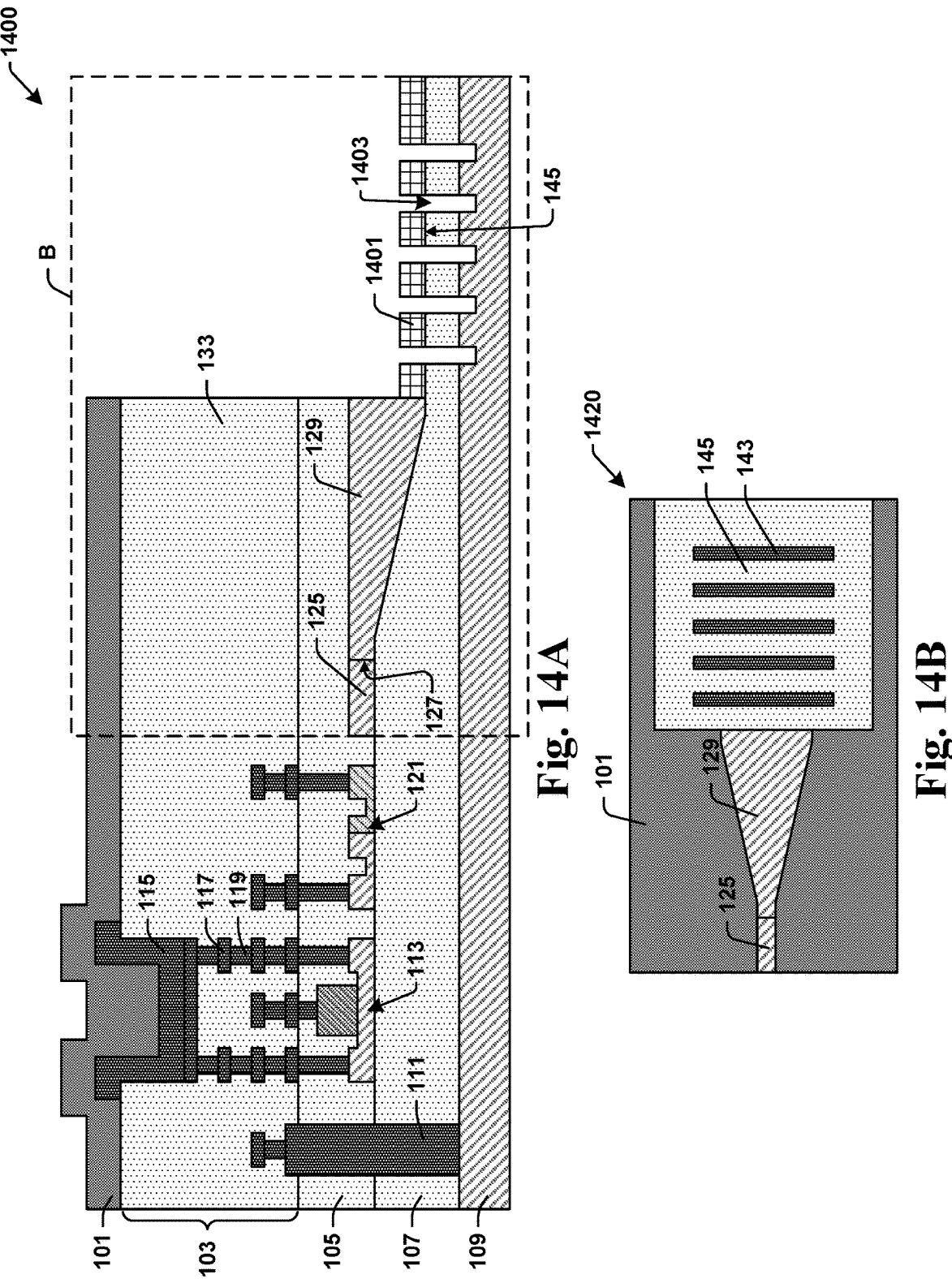

As shown by the cross-sectional view 1400 of FIG. 14A and the plan view 1420 of FIG. 14B, a mask 1401 may be formed and used to etch trenches 1403 in the pedestal 145. The trenches 1403 extend into the handle substrate 109. The etch process may be plasma etching, the like, or any other suitable process. After etching, the mask 1401 is stripped.

The trenches 1403 may be filled and the laser diode 139 or another photonic device placed in the pedestal cavity 135 to form a photonic device such as the photonic device 100 shown by the cross-sectional view of FIG. 1A and the plan view of FIG. 1B. In some embodiments, the material that fills the trenches 1403 is a metal or some other conductive material, whereby the metal plugs 143 formed by filling trenches 1403 may provide an electrical connection between the laser diode 139 and the substrate 109. In some embodiments, the material that fills the trenches 1403 bonds the laser diode 139 or other such device to the pedestal 145. For example, the laser diode 139 may be attached to the pedestal 145 by laser bonding with under bump metallization. In such cases, the material that fills the trenches 1403 may be carried by the laser diode 139 or other such photonic device that is placed on the pedestal 145 in the pedestal cavity 135.

Figures 15A, 15B:
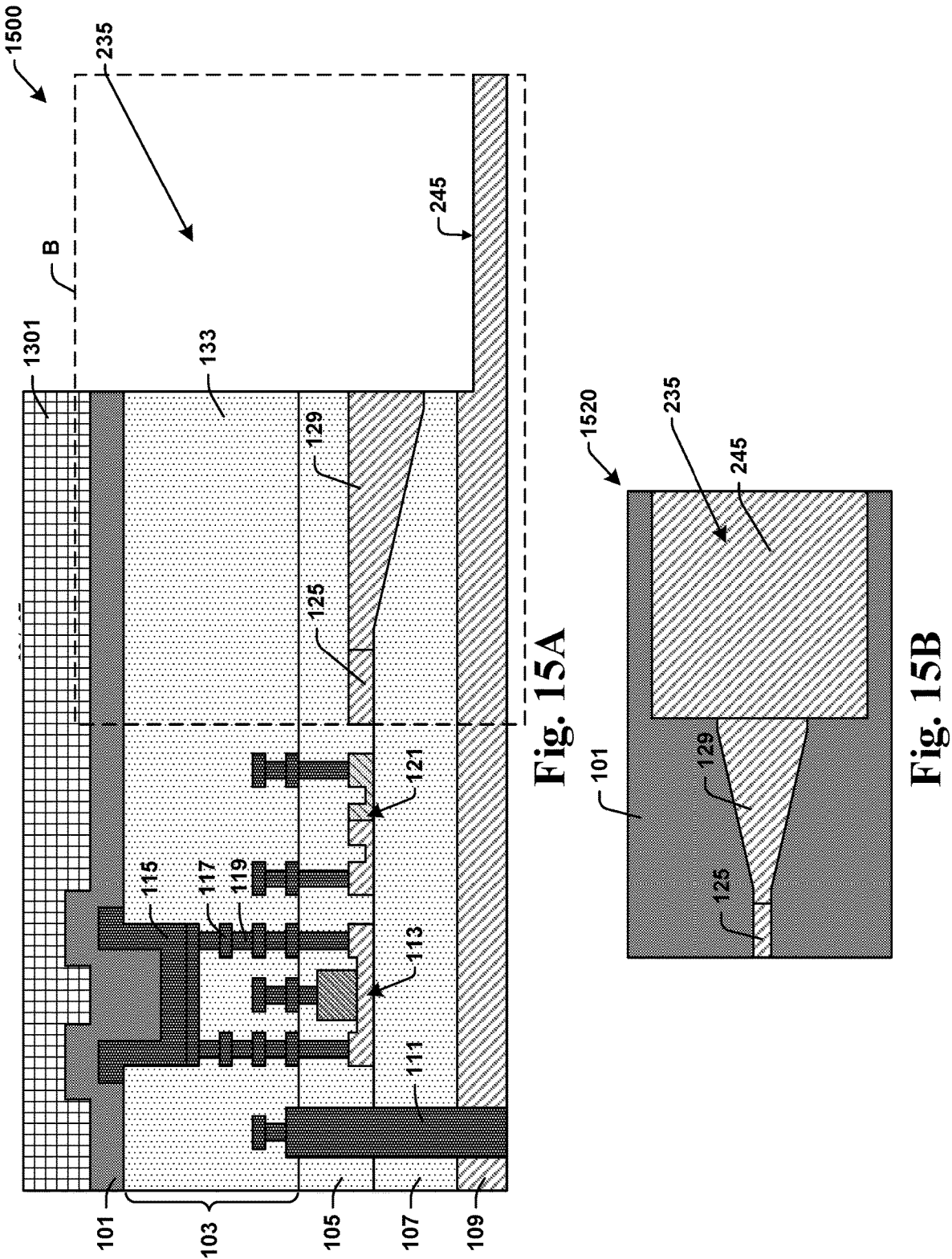
FIGS. 15A-15B illustrate cross-sectional and plan views for a variation on the process of FIGS. 3-14B.

The cross-sectional view 1500 of FIG. 15A and the plan view 1520 of FIG. 15B illustrate a variation of the process of FIGS. 3-14B that may be used to form the photonic device 200 of FIGS. 2A and 2B. As shown by FIGS. 15A and 15B, the main difference is in etching the pedestal cavity 235. The pedestal cavity 235 is deeper that than the pedestal cavity 135 (see FIG. 14A). The pedestal cavity 235 extends into the handle substrate 109 so that the pedestal 245 is formed out of the handle substrate 109. An optical fiber or other photonic device may be place in the cavity on the pedestal 245 to form the photonic device 200 of FIGS. 2A and 2B or another such device.

Figure 16:
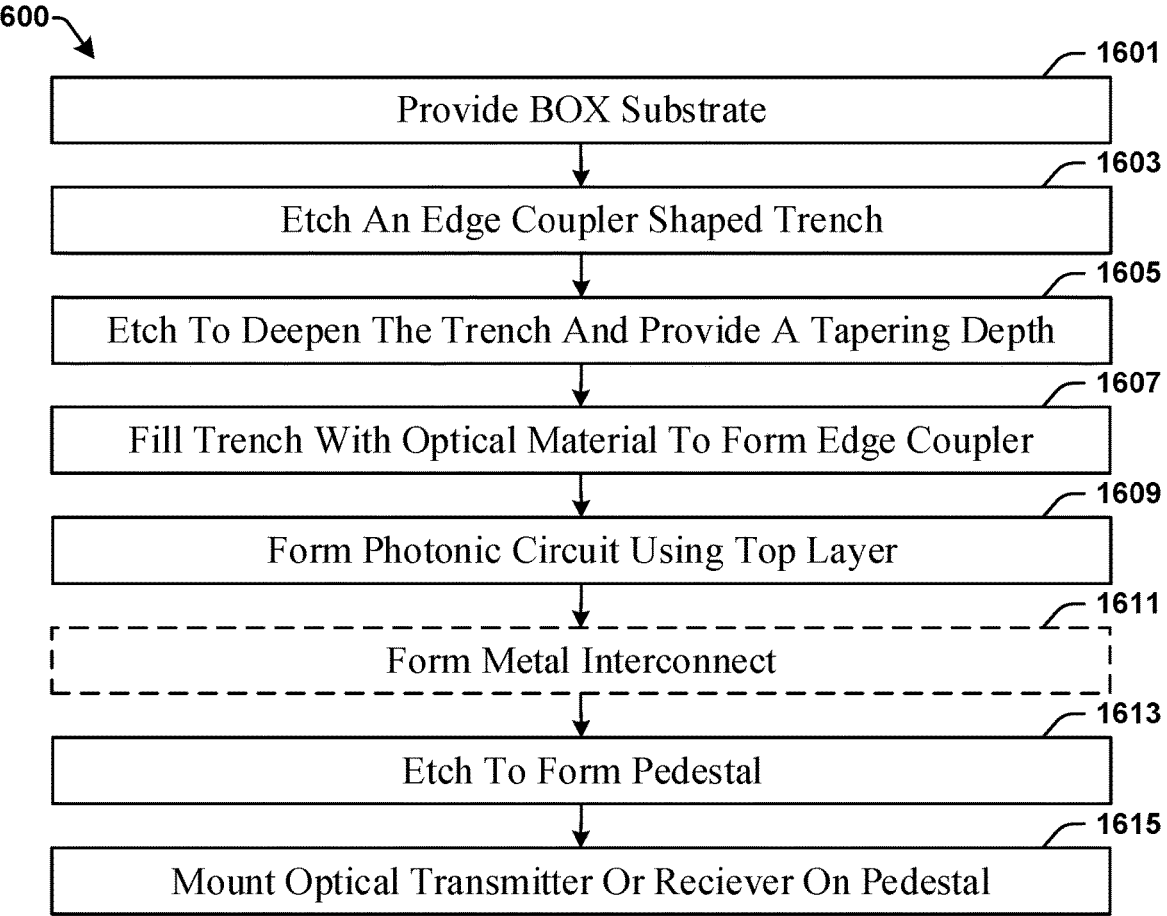
FIG. 16 provides a flow chart illustrating a method of forming photonic device in accordance with some embodiments.

FIG. 16 presents a flow chart for a process 1600 that may be used to form a photonic device according to the present disclosure. While the process 1600 of FIG. 16 is illustrated and described herein as a series of acts or events, it will be appreciated that the illustrated ordering of such acts or events is not to be interpreted in a limiting sense. For example, some acts may occur in different orders and/or concurrently with other acts or events apart from those illustrated and/or described herein. Further, not all illustrated acts are required to implement one or more aspects or embodiments of the description herein, and one or more of the acts depicted herein may be carried out in one or more separate acts and/or phases.

The process 1600 may begin with act 1601, providing a BOX substrate. A box substrate includes a handle substrate, an oxide layer, and a top layer. The top layer has a thickness and is of a material suitable for waveguides and other photonic devices. The cross-sectional view 300 of FIG. 3 illustrates an example of this type of substrate.

Act 1603 is etching an edge coupler-shaped trench. The trench may be formed in a hard mask that is formed over the BOX substrate. The cross-sectional view 400 of FIG. 4A and the plan view 420 of FIG. 4B provide an example. Optionally, the trench extends into the top layer. An edge-coupler shaped trench is one that has a tapering width. The width tapers from a narrow end that has the width of a waveguide to a wide end having a larger width that corresponds to the spot size of an external device such as a laser diode or an optical fiber.

Act 1605 is etching that extends the trench into the oxide layer with a depth that tapers from a lesser depth at the narrow end to a greater depth at the wide end. The cross-sectional view 500 of FIG. 5A and the plan view 520 of FIG. 5B provide an example. The lesser depth may extend down only to the top of the oxide layer. In some embodiments, the depth varies by a span in the range from about 50% to about 100% of the variation in width. The depth may tapper over a length of the trench over which the width also tappers. In some embodiments, a process by which the trench depth is made to tapper has an etch rate that varies in relation to the trench width.

Act 1607 is filling the trench with an optical material. The fill process may include deposition of the optical material and planarization to remove optical material that deposits outside the trench. The optical material that fills the trench provides the edge coupler. The cross-sectional views 600 and 700 and FIGS. 6 and 7 show an example.

Act 1609 is forming a photonic circuit. The photonic circuit is formed in part by patterning the top layer. Patterning the top layer forms a waveguide coupled to the narrow end of the edge coupler. In some embodiments, forming the photonic circuit includes doping some portions of the top layer. In some embodiments, forming the photonic circuit includes epitaxial growth of a semiconductor on the top layer. The cross-sectional views 800 and 900 and FIGS. 8 and 9 provide an example.

Act 1611 is an optional step of forming a metal interconnect over the photonic circuit. Coupling the photonic circuit to an electrical circuit through a metal interconnect increases functionality. Bond pads, through substrate vias, and the like may also be formed for this purpose. The cross-sectional views 1000-1200 and FIGS. 10-12 provide an example.

Act 1613 is etching to form a pedestal. In some embodiments, the pedestal is at or below the height of the bottom of the edge coupler. In some embodiments, the pedestal is formed in the oxide layer and has an upper surface at a height close to the bottom of the edge coupler. The cross-sectional view 1300 of FIG. 13A and the plan view 1320 of FIG. 13B provide an example. In some embodiments, the pedestal is lower and is provided by the handle substrate. The cross-sectional view 1500 of FIG. 15A and the plan view 1520 of FIG. 15B provide an example.

Act 1615 is mounting an optical transmitter or receiver on the pedestal. In some embodiments, the device is an optical transmitter such as a laser diode, an optical fiber, or the like. The photonic device 100 of FIGS. 1A-1B and the photonic device 200 of FIGS. 2A-2B provide examples of the resulting structure.

Some aspects of the present disclosure relate to a photonic device that includes a photonic integrated circuit and an edge coupler. The edge coupler has a narrow end and a wide end. The narrow end is coupled to a waveguide in the photonic integrated circuit. The edge coupler has a thickness that tappers in a first region between the wide end and the narrow end. In some embodiments, an upper surface of the edge coupler is planar. In some embodiments, the width tappers in conjunction with the thickness. In some embodiments, the photonic device includes an oxide layer, the waveguide is directly above the oxide layer, and the edge coupler tappers into the oxide layer. In some embodiments and optical transmitter or receiver is mounted to a pedestal formed by the oxide layer. In some embodiments, the pedestal has an upper surface that is vertically aligned with a bottom of the edge coupler to within a distance that is less than a thickness of the waveguide. In some embodiments, the edge coupler has a constant thickness in a second region that extends between the first region and the wide end. In some embodiments, the pedestal is formed by a substrate beneath the oxide layer.

Some aspects of the present disclosure relate to a photonic device that includes an oxide layer, a photonic integrated circuit comprising a waveguide disposed over the oxide layer, and an optical transmitter or receiver mounted on a pedestal. A top of the pedestal is lower than a bottom of the waveguide. An edge coupler is disposed on the oxide layer, tappers downward into the oxide layer, and couples the optical transmitter or receiver to the waveguide. In some embodiments, the top of the pedestal is vertically aligned with the bottom of the edge coupler to within a distance that is less than a thickness of the waveguide. In some embodiments, the oxide layer is between a substrate and the photonic integrated circuit and the pedestal is provided by the substrate. In some other embodiments, the pedestal is provided by the oxide layer. In some embodiments, a top of the edge coupler is vertically aligned with a top of the waveguide.

Some aspects of the present disclosure relate to a method of manufacturing a photonic device. The method includes etching a trench in the top layer and the buried oxide layer of a BOX substrate. The trench has a first region in which a depth of the trench has a taper and a second region in which the trench has a depth equal to a maximum depth of the taper. The trench is filled with an optical material having a higher refractive index than the buried oxide layer. A photonic integrated circuit is formed in the top layer and a pedestal in formed in the second region. An optical transmitter or receiver is mounted on the pedestal. A portion of the optical material that fills the trench forms an edge coupler between the optical transmitter or receiver and the photonic integrated circuit. In some embodiments, a top of the pedestal is closer in height to a bottom of the edge coupler than to the handle substrate. In some embodiments, a metal interconnect is formed above the photonic integrated circuit, and forming the pedestal in the second region comprises etching through the interlevel dielectric layer of the metal interconnect. In some embodiments, forming the pedestal comprises a first etch process that etches through the optical material. In some embodiments, the first etch process has a higher etch rate for the optical material than for the buried oxide layer. In some embodiments, the process includes a second etch process that forms a trench in the pedestal. In some embodiments, a mask is formed over the top layer and the mask has an opening with a width that tapers. In these embodiments, etching a trench in the top layer and the buried oxide layer comprises an etch process with an etch rate that depends on the trench width.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
providing a BOX substrate comprising a handle substrate, a buried oxide layer, and a top layer;
etching a trench in the top layer and the buried oxide layer, wherein the trench has a first region in which a depth of the trench has a taper and a second region in which the trench has a depth greater than or equal to a maximum depth of the taper;
filling the trench with an optical material having a higher refractive index than the buried oxide layer;
forming a photonic integrated circuit in the top layer;
forming a pedestal within the second region; and
mounting an optical transmitter or receiver on the pedestal, wherein a portion of the optical material that filled the trench forms an edge coupler between the optical transmitter or receiver and the photonic integrated circuit.

2. The method of claim 1, wherein a top of the pedestal is closer in elevation to a bottom of the edge coupler than to the handle substrate.

3. The method of claim 1, further comprising forming a metal interconnect comprising an interlevel dielectric layer above the photonic integrated circuit, wherein forming the pedestal in the second region comprises etching through the interlevel dielectric layer.

4. The method of claim 1, wherein forming the pedestal comprises a first etch process that etches through the optical material.

5. The method of claim 4, wherein the first etch process has a higher etch rate for the optical material than for the buried oxide layer.

6. The method of claim 5, further comprising a second etch process that forms a second trench in the pedestal.

7. The method of claim 6, further comprising:

forming a mask over the top layer, wherein the mask has an opening with a width that tapers, and etching a trench in the top layer and the buried oxide layer comprises an etch process with a rate that depends on the width.

8. A method, comprising forming a trench in a BOX substrate, wherein:

the BOX substrate comprises a top layer, a handle substrate, and an oxide layer between the top layer and the handle substrate;

the trench has a first end with a first depth and a second end with a second depth greater than the first depth; and the depth of the trench tapers between the first end and the second end;

depositing an optical material into the trench to form an edge coupler having a thickness that tapers from the first end to the second end;

planarizing the optical material to define an upper surface of the edge coupler that is substantially coplanar with an upper surface of the top layer;

forming a photonic integrated circuit in the top layer;

forming a metal interconnect comprising an interlevel dielectric layer over the photonic integrated circuit; and forming a pedestal cavity that intersects the second end of the edge coupler by a process that includes etching through the interlevel dielectric and into the BOX substrate to at least the second depth.

9. The method of claim 8, wherein forming the trench in the top layer and the oxide layer of the BOX substrate comprises a plasma etch process having an etch rate that varies with trench width, and the variation in etch rate creates the difference between the first depth and the second depth.

10. The method of claim 8, wherein the optical material has the same composition as the top layer.

11. The method of claim 8, wherein planarizing comprises chemical mechanical polishing that also removes a hard mask from over the top layer.

12. The method of claim 8, wherein the pedestal cavity extends into the handle substrate.

13. A method, comprising:

forming a tapered trench in a BOX substrate, the BOX substrate comprising a top layer, an oxide layer, and a handle substrate, wherein the trench tapers in both depth and width from a narrow end to a wide end;

filling the trench with an optical material to define an edge coupler; and etching to form a pedestal cavity that intersects the wide end of the edge coupler.

14. The method of claim 13, wherein a bottom of the pedestal cavity is aligned with a bottom of the wide end.

15. The method of claim 13, further comprising mounting an optical fiber in the pedestal cavity, wherein the optical fiber comprises an optical core, and a depth of the pedestal cavity vertically aligns the optical core to the edge coupler.

16. The method of claim 15, wherein a width of the pedestal cavity horizontally aligns the optical core to the edge coupler.

17. The method of claim 13, wherein the pedestal cavity intersects a portion of the edge coupler that has a constant width.

18. The method of claim 13, wherein etching to form the pedestal cavity comprises monitoring an etch byproduct to determine an endpoint for the etching process.

19. The method of claim 13, further comprising etching second trenches into a bottom of the pedestal cavity and filling the second trenches with a conductive material to form electrical contacts.

20. The method of claim 13, further comprising:

forming a photonic integrated circuit in the top layer; and forming a metal interconnect comprising an interlevel dielectric layer over the photonic integrated circuit, wherein etching to form the pedestal cavity comprises etching through the interlevel dielectric layer.

* * * * *